United States Patent
Oinonen et al.

(10) Patent No.: US 6,275,710 B1
(45) Date of Patent: Aug. 14, 2001

(54) SYSTEM FOR TRANSMITTING STATUS DATA, METHOD FOR TRANSMITTING STATUS DATA ON A CONNECTION INTERFACE, AND A TELECOMMUNICATION TERMINAL

(75) Inventors: Kari Oinonen, Lempäälä ; Mirja Pautamo, Tampere, both of (FI)

(73) Assignee: Nokia Mobile Phones Limited, Espoo (FI)

(*) Notice: Subject to any disclaimer, the term of this patent is extended or adjusted under 35 U.S.C. 154(b) by 0 days.

(21) Appl. No.: 09/233,376

(22) Filed: Jan. 19, 1999

(30) Foreign Application Priority Data

Jan. 20, 1998 (FI) ................................................ 980115

(51) Int. Cl.[7] .................................................. H04Q 7/20
(52) U.S. Cl. .......................................... 455/466; 455/557
(58) Field of Search ....................... 455/422, 432, 455/466, 517, 556, 557, 67.1, 418, 419, 420

(56) References Cited

U.S. PATENT DOCUMENTS

| | | | |
|---|---|---|---|
| 5,351,235 | 9/1994 | Lahtinen | 370/58.1 |
| 5,604,921 | 2/1997 | Alanara | 455/45 |
| 5,692,032 | 11/1997 | Seppanen et al. | 379/59 |
| 5,787,341 | 7/1998 | Parkas et al. | 455/90 |
| 5,794,142 | 8/1998 | Vanttila et al. | 455/419 |
| 5,797,102 | 8/1998 | Hallikainen et al. | 455/557 |
| 5,799,255 | 8/1998 | Berg et al. | 455/551 |
| 5,842,141 | 11/1998 | Vaihoja et al. | 455/574 |
| 5,915,225 * | 6/1999 | Mills | 455/466 |
| 5,966,653 * | 10/1999 | Joensuu et al. | 455/466 |
| 6,044,275 * | 3/2000 | Boltz et al. | 455/466 |
| 6,047,194 * | 4/2000 | Andersson | 455/466 |
| 6,094,587 * | 7/2000 | Armanto et al. | 455/567 |
| 6,101,393 * | 8/2000 | Alperovich et al. | 455/466 |
| 6,104,932 * | 8/2000 | Havinis | 455/466 |
| 6,108,559 * | 8/2000 | Astrom et al. | 455/466 |
| 6,119,014 * | 9/2000 | Alperovich et al. | 455/466 |

FOREIGN PATENT DOCUMENTS

| | | |
|---|---|---|
| 197 09 827A1 | 9/1998 | (DE) . |
| 0645941 A2 | 3/1995 | (EP) . |
| 0 772 367 A2 | 5/1997 | (EP) . |
| 0813855 A2 | 12/1997 | (EP) . |
| WO 94/13092 | 6/1994 | (WO) . |

OTHER PUBLICATIONS

"Digital cellular telecommunications system; Unstructured Supplementary Service Data(USSD)—Stage 2" (GSM 03.90) Version 5.0.0, Dec. 1996 ETSI.

"Digital cellular telecommunications system (Phase 2+); General Packet Radio Service (GPRS): Service description; Stage 2" (GSM 03.60 version 5.2.0) ETSI.

* cited by examiner

Primary Examiner—Nay Maung
Assistant Examiner—Quochien B. Vuong
(74) Attorney, Agent, or Firm—Perman & Green, LLP (57) ABSTRACT

A system and method for transmitting status data between a first telecommunication terminal, with at least one connection interface comprising connection lines, and a second telecommunication terminal, wherein the state of at least one connection line is examined and/or set, and a data transmission connection is set up between the first and second telecommunication terminals whereby the status of the at least one connection line is arranged to be transmitted between the first and second telecommunication terminals in a manner that one or several connnectionless messages are arranged to be used in the transmission.

16 Claims, 7 Drawing Sheets

SYSTEM FOR TRANSMITTING STATUS DATA, METHOD FOR TRANSMITTING STATUS DATA ON A CONNECTION INTERFACE, AND A TELECOMMUNICATION TERMINAL

FIELD OF THE INVENTION

The present invention relates to a system for transmitting status data as set forth in the preamble of the appended claim 1, a method for transmitting status data on a connection interface as set forth in the preamble of the appended claim 9, and a telecommunication terminal as set forth in the preamble of the appended claim 12.

BACKGROUND OF THE INVENTION

In digital mobile communication systems, such as the GSM system, it is possible to send messages without setting up a connection with a circuit coupling. Such non-connection methods for message transmission include the short message service SMS, the unstructured supplementary service data USSD, or the general packet radio service GPRS. Thus, in addition to calls and data transmission, the GSM system offers a paging system type service in the form of the short message service. However, in view of an ordinary paging system, the short message system known from the GSM system is considerably more sophisticated. A mobile station can be used not only to receive text messages but also to transmit them to another mobile station. Another advantage of the short message service of the GSM system is that the transmission or reception of a short message can take place simultaneously when an ordinary circuit coupled connection is open, e.g. during a call. Thus, the transmission of a short message will not keep the mobile station busy upon a possible incoming call.

Figure 1:
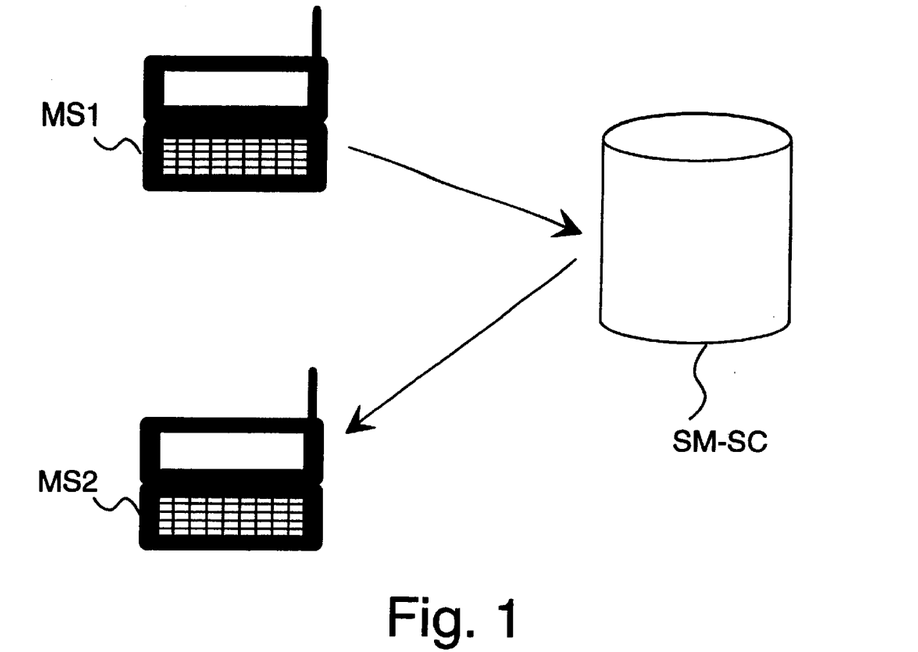
FIG. 1 shows the route of a short message from one mobile station to another.
Figure 2:
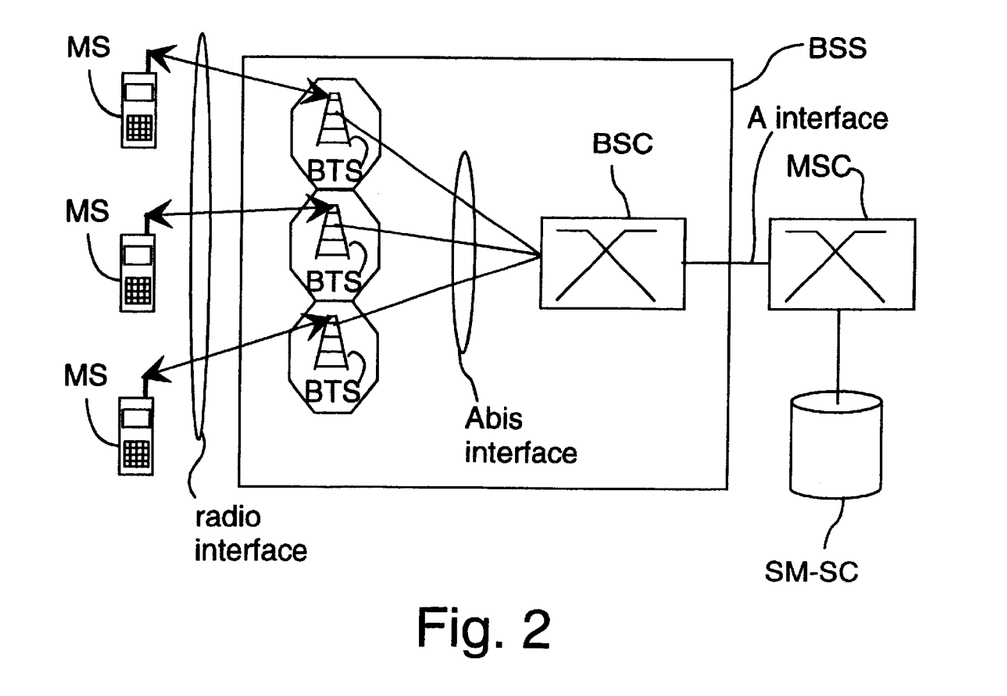
FIG. 2 shows the connections of a mobile communication system to a short message service centre.

It is an advantage of short messages to calls that they can be forwarded to the receiver even if a connection could not be made to the receiver at the moment of transmission. This is implemented by dividing the transmission of a short message from a mobile station to another in two parts, as illustrated in FIG. 1: from the transmitting mobile station MS1 to a short message service centre SM-SC where the short message is stored and transmitted further to the actual destination, i.e. the receiving mobile station MS2, when a connection can be made to it. FIG. 2 illustrates the connection between the short message service centre SM-SC to the mobile communication system in more detail. In the following, the transmission and progression of short messages between different interfaces, known as such, will be described with reference to FIGS. 1 and 2.

FIG. 2 shows the structure of the mobile communication system and the connections for transmitting short messages. Mobile stations MS have radio communication with base transceiver stations BTS. The base transceiver stations BTS communicate further, via a so-called Abis interface, with a base stations controller BSC which controls several base transceiver stations. A unit consisting of several base transceiver stations BTS (typically some dozens of base transceiver stations) and one base station controller BSC controlling them is called a base station subsystem BSS. In particular, the base station controller BSC controls the channels of radio communication and hand-overs between channels. On the other hand, the base station controller BSC communicates, via a so-called A interface, a mobile services switching centre (MSC) which coordinates the setting up of connections from and to mobile stations. Via the mobile services switching centre MSC, a connection is further made outside the mobile communication network. Said short message service centre SM-SC is coupled with the mobile services switching centre MSC.

For transmitting a short message from a mobile station MS1 (FIG. 1), the message to be transmitted is formed, and the telephone number of the mobile station MS2, i.e. the identification where the transmission is addressed, is given. The short message is usually entered via the keypad of the mobile station, and the telephone number can be entered via the keypad or selected e.g. from a telephone directory stored in the mobile station. Further, the mobile station transmitting the short message must know the contact data, i.e. the telephone number, of the short message services centre SM-SC. This is usually stored in the memory of the mobile station, wherein there is no need to enter it separately in connection with each short message transmission. When the short message is transmitted, it passes from the mobile station MS to the base transceiver station BTS and further via the base station controller BSC and the mobile services switching centre MSC to the short message services centre SM-SC. The short message is stored at the short message services centre SM-SC, from where it is transmitted further to the receiving mobile station MS2, wherein the route is the same as in the transmission but reverse. The short messages services centre SM-SC is informed whether the mobile station MS2 has received the short message. Thus, it can retransmit the short message, if it was for any reason not received by the mobile station MS2.

In the short message service SMS of the GSM system, it is possible to transmit a message of a maximum length of 160 characters at a time. The characters are e.g. ASCII characters (American National Standard Code for Information Interchange) of 7 bits, but it is also possible to transmit characters of 8 bits which are not necessarily ASCII characters. Also short message services have been developed where the message can be transmitted in several short messages of a maximum length of 160 characters, whereby the length of the short message can be multiplied. For example in the GSM mobile communication system, the abbreviation C-SMS is used for this concatenated short message service.

The general packet radio service GPRS comprises separate network elements, such as GPRS support nodes and GPRS registers, as well as transmission systems. The transmission system used can be for example the TCP/IP (Transmission Control Protocol/Internet Protocol) network. Because the data transmission is conducted in a packet network where the data to be transmitted is conveyed in one or several data packets, the maximum benefit is obtained by all service subscribers from such packet form data transmission. In such packet data transmission, the data transmission channel (radio channel) is not reserved for one user during the entire connection, but only when data packets are being transmitted. This makes it possible to transmit data packets of several users in the same data transmission channel so that the data packets of different users are transmitted in their own time slots. Each data packet is equipped with address data, i.e. the telephone number or another identification of the recipient. In this connection, reference is made e.g. to the standard GSM 03.60 of the European Telecommunication Standards Institute ETSI, containing a more detailed description of the general packet radio service GPRS of the GSM system.

In addition to data and voice transmission services transmitted via the communication channel, cellular systems offer supplementary services, whereby data transmission relating to these is conveyed via a signalling channel. Thus, data transmission relating to supplementary services can, if necessary, take place simultaneously with the connection on the communication channel.

Messages relating to supplementary services are transmitted between the mobile station on one hand and the home location register (HLR) or the visitor public land mobile network (VPLMN) of the cellular system on the other hand. The message to be transmitted contains information on how the network element should process the message. For supplementary services to be introduced in cellular systems, the messages related to the supplementary service can be transmitted e.g. in the GSM system as an unstructured supplementary service, i.e. USS data, wherein messages can be transmitted in a transparent manner also in such parts of the system that do not know said supplementary service. In this context, reference is made to the ETSI standard GSM 03.90 which contains a description on the transmission of unstructured supplementary service data USSD, applied in the GSM mobile communication network.

SUMMARY OF THE INVENTION

In this specification, telemetric applications refer to applications in which the state of a peripheral device is monitored and the peripheral device is controlled via a telecommunication network, preferably at least partly via a mobile communication network. This is also called remote drive and remote control. A known telemetric system is a real estate alarm system for monitoring real estate for fire, leakage, burglary, etc. and transmitting the alarm e.g. to a private security company. The alarm system transmits the alarm via a telecommunication network to a monitoring room, where the alarm is received by a robot telephone which will inform the monitoring personnel. A disadvantage in this system is the fact that the transmission of the alarm requires that a telephone connection is set up, whereby a connection cannot be necessarily made if the telephone lines of the monitoring room are busy. Further, the system requires a robot telephone or the like, whereby this telephone reserves one central line solely for this purpose. Consequently, a monitoring room for monitoring several different alarm system must be possibly equipped with several telephone lines which are available for the alarm system only. This increases the costs of the monitoring system.

Another telemetric application is the remote drive and control of pump stations in a sewer system, whereby the pump station is equipped with detectors for monitoring the position and operating state of pumps and valves. This information from the detectors is transmitted to a transceiver, from which the information is transmitted either by the radio channel or via a telecommunication network to a monitoring room provided with a transceiver whereby this status information is received. In a corresponding manner, the transceiver of the monitoring room can be used for transmitting control commands to the pump station, where these control commands are received by the transceiver. On the basis of the control commands, the pumps and valves are controlled for changing their state, if necessary. The equipment involved in such systems is usually specific, whereby the same equipment cannot be necessarily used for other kinds of control and monitoring operations than they are intended for. The production numbers of such specific equipment are relatively small, whereby it is not possible to utilise the benefits of mass production, which raises the unit price of such equipment.

A remote-controlled heating system is also known, in which the heating of an apartment can be set by telephone for example so that the heating can be switched from a lower output to a higher output, or vice versa, by calling a certain telephone number. This application can be used e.g. for controlling the heating of a summer cottage or a sauna. The dweller may switch the heating to a higher output well in advance before his/her arrival at the summer cottage, wherein the temperature of the summer cottage or sauna has risen to a sufficiently high level by the time the dweller arrives. Also a system of this type is intended primarily for controlling heating, whereby it cannot necessarily be easily applied for another purpose. Also, markets for these systems are not very large, whereby costs per unit rise to a relatively high level.

For controlling and monitoring peripheral devices to be used in telemetric systems of this kind, it is typical to use current messages or voltage messages. For control and measurement of peripheral devices, current and voltage message standards have been drawn up, e.g. current ranges from 4 mA to 20 mA or from 0 mA to 20 mA. Thus, for control and measurement of peripheral devices, the aim is to use these standardised current messages. In control commands of the open/closed type, the control message is set to the lower limit (4 mA or 0 mA) for setting the device to be controlled in a first position, e.g. for closing a valve. In a corresponding manner, for setting the device to be controlled in a second position, e.g. for opening the valve, the control message is set to the upper limit, e.g. 20 mA. In a corresponding manner at measurements, when the measuring message is at the lower limit (0/4 mA), it indicates that the device to be measured is at its first position (valve closed), and correspondingly, when the measuring message is at the upper limit (20 mA), it indicates that the device to be measured is at its second position (valve open). Instead of current messages, it is also possible to use voltage messages, wherein said values typically correspond to voltage ranges from 1 V to 5 V and from 0 V to 5 V. Sometimes it is necessary to convert current messages to voltage messages and vice versa, but this is prior art known as such to a man skilled in the art, whereby it is not necessary to describe it in more detail in this context.

One purpose of the present invention is to achieve a monitoring and control system whereby information is transmitted between a peripheral device and a mobile station. Further, information is transmitted by using e.g. short messages or the like. The system of the present invention is characterised in what is presented in the characterising part of the appended claim 1. The method of the present invention is characterised in what is presented in the characterising part of the appended claim 9. Further, the telecommunication terminal of the present invention is characterised in what is presented in the characterising part of the appended claim 12. The invention is based on the idea that the telecommunication terminal, preferably a mobile station coupled with a peripheral device via a connecting interface, transmits short messages or the like to another telecommunication terminal preferably via a mobile communication network. In a corresponding manner, control signals can be transmitted as short messages from the second telecommunication terminal to the first telecommunication terminal, where the device coupled therewith is controlled on the basis of the short messages via the connection interface.

The present invention gives considerable advantages to the systems and methods of prior art. The method of the invention can be applied by using conventional mobile stations equipped with the option for transmitting short messages or the like, preferably messages to be transmitted in text form. Thus, the state of the peripheral device coupled with the mobile station is monitored on the basis of changes in the state of lines in the connection interface, whereby upon a change in the state, a short message is arranged to be transmitted and received by a second mobile station, possibly informing the user of the mobile station preferably as a message displayed on the display of the mobile station. In a corresponding manner, the control of the peripheral device can be arranged easily by means of short messages, wherein the user selects or writes a message which corresponds to the desired control operation and is transmitted to the mobile station coupled with the peripheral device, whereby the state of the corresponding connection line is changed at the connection interface on the basis of this short message. As a result, the peripheral device conducts the desired operation. Because such mobile stations are very common and their price is inexpensive, this kind of a control system can be implemented in a very inexpensive and easy way. The implementation of the system according to the invention requires no fixed line for the transmission of messages, and it is possible to use existing common mobile communication networks instead of separate networks. Further, the reception of messages is more secure than in systems of prior art. By this method of the invention, it is possible to provide a general control system for telemetric applications, as it is easy to edit short messages. This invention can be implemented in a number of different types of telemetric applications, thus avoiding an investment in specific equipment. For implementing such telemetric applications, it is possible to use mobile stations already on market, whereby only their program needs to be updated. In simple applications, in which the transmission of a message is required one way only, the option for message transmission is not necessarily required in the receiving telecommunication terminal.

BRIEF DESCRIPTION OF THE DRAWINGS

In the following, the invention will be described in more detail with reference to the appended drawings, in which.

DETAILED DESCRIPTION

In this description, the standardised V.24 connection is used as an example of a connection interface 7. This standard presents a connection interface with 9 available connection lines, eight of which can be used for the transmission of signals and one being reserved as a signal ground conductor GND. Further, the standard classifies the connection interface to be of data terminal equipment (DTE) type and data communication equipment (DCE) type. Data terminals DTE usually include personal computers (PC), and data communication equipment DCE include modems for connecting data terminals to the telecommunication network.

Figure 3:
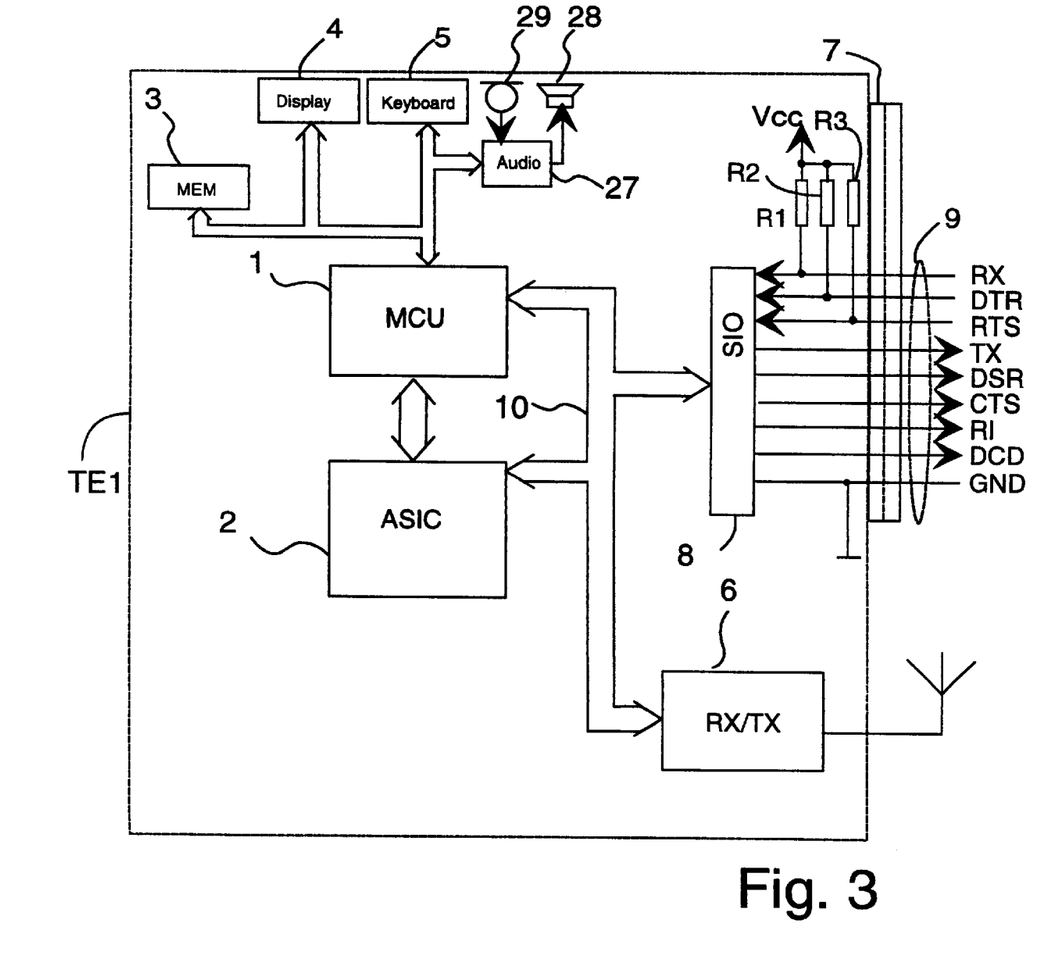
FIG. 3 is a block chart showing a telecommunication terminal according to an advantageous embodiment of the invention.

In the block chart of FIG. 3, these 9 connection lines are shown by using terms complying with said standard and seen from the viewpoint of the data communication equipment DCE. Arrows indicate input and output lines of the data terminal DTE. Input lines include a data reception line RX, a telecommunication terminal status line DTR (data terminal ready), and a transmission request line RTS (ready to send). Output lines include a data transmission line TX, a data communication equipment status line DSR (data set ready), a clear to send line CTS, a ring indicator RI, and a data carrier detect line DCD. In normal data communication applications, the data terminal DTE is coupled to data communication equipment DCE, such as a modem. The data communication equipment DCE carries out the signal adapting between the telecommunication network and the data terminal DTE. The signals are transmitted via this V.24 connection, wherein the data terminal DTE is provided with a corresponding connection interface, but there the input lines are the input lines TX, DSR, CTS, RI, DCD of the data communication equipment and, correspondingly, the output lines are the input lines RX, DTR, RTS of the data communication equipment DCE. On the other hand, by this V.24 connection, it is possible to connect also similar equipment with each other, for example according to the DCE-DCE type or the DTE-DTE type. Thus, the connection lines must be coupled in pairs crosswise so that the output line of the first device is coupled to the corresponding input line of the second device, for example TX-RX, DSR-DTR, CTS-RTS. This is known as such, whereby it does not need to be described in more detail in this context. The V.24 standard is a standard defined by the international standardisation organisation CCITT. A corresponding standard is also known by the name RS-232C, which is a standard defined by the standardisation organisation EIA.

The V.24 connection is typically used in data transmission in serial form, whereby it is also called a serial connection. By this connection it is possible to transmit binary information. The signal is typically transmitted as a voltage signal, for example as a symmetrical +12 V/−12 V signal, whereby the voltage value +12 V indicates the logical 0 state and, correspondingly, the voltage value −12 V indicates the logical 1 state. In some applications, so-called transistor—transistor logic (TTL) signals 0/5 V are used, 0 V indicating the logical 0 state and 5 V indicating the logical 1 state.

Below in this description, it will be assumed that the logical 0 state is indicated by a signal of ca. 0 V and the logical 1 state is indicated by a signal of ca. 5 V. In a corresponding manner for controlling, the voltage value of ca. 0 V will be used when the control signal is set to the logical 0 state, and the voltage is set to a value of ca. 5 V when the control signal is set to the logical 1 state.

In this description, the first telecommunication terminal TE1 (terminal equipment) indicates the telecommunication terminal to which the peripheral device to be controlled or monitored is connected by means of the V.24 connection interface. In a corresponding manner, the second telecommunication terminal TE2 indicates e.g. a telecommunication terminal carried along by the user, whereby the user can control the peripheral device or control its state. However, the second telecommunication terminal TE2 can also be another type of telecommunication terminal, whereby a message-based data transmission connection can be set up to the first telecommunication terminal. One example is a data processor (not shown) provided with a modem or the like, whereby the messages can be transmitted e.g. via the Internet data network. Another assumption is that the first telecommunication terminal TE1 is, in view of said V.24 standard, data communication equipment DCE, but the invention is not limited solely to this type of first telecommunication terminal TE1.

FIG. 3 shows an advantageous embodiment for the first telecommunication terminal TE1 in a reduced block chart. In this example, the first telecommunication terminal TE1 is a mobile station comprising e.g. a processor 1, such as a microprocessor; an application-specific integrated circuit 2 (ASIC), whereby it is possible to implement a majority of the logic functions of the data processor 1 and simultaneously to reduce the number of separate integrated circuits; a memory 3, a display 4, a keypad 5, a radio element 6, and a connection interface 7. The application software of the processor 1 contains the application programs necessary for implementing the mobile station functions as well as the functions required for controlling the mobile station MS, including reading of the keypad 5, control of the display 4, and control of the connection interface 7. The connection interface 7 comprises e.g. a serial connection circuit 8, known as such, whereby e.g. the buffering of signals between the serial port 9 and the bus 10 of the processor is implemented. Further, FIG. 3 shows as an example an audio block 27 with an ear piece 28 and a microphone 29.

In this context, it is shortly mentioned that the processor 1 can be used for addressing certain storage spaces and connection sp aces. The size of the storage space is typically considerably larger (even several megabytes) than the size of the connection space (a few hundred bytes or kilobytes). For processing the storage space and for processing the connection space, separate control lines (including read and write lines) are provided in the control bus, respectively. The space intended for processing at a time is addressed in the address bus by address lines which may total e.g. 32 for addressing the storage space and few of which (8/16) are used for addressing the connection space. The control lines are used to define more precisely which space is to be processed and, on the other hand, whether the processor 1 reads or writes data. A data bus is used for reading and writing data. For the sake of clarity, address, control and data buses are shown as one bus 10 in the block diagram of FIG. 3. Furthermore, the bus 10 may include bufferings for signal amplification, but these are not shown in the appended drawings.

It is obvious that the second telecommunication terminal TE2 used may be a mobile station of the type p resented above.

The connection interface 7 is implemented advantageously on the connection space of the processor in a way that a separate address space (I/O address) is determined for the serial connection circuit 8 for controlling and reading the serial connection circuit. Also, the address space is usually divided into control and data spaces, wherein it is possible to read the state of the status lines of the connection interface 7 via the control space. In a corresponding manner, data transmission takes place via the data space, wherein the bits to be transmitted, typically 8 bits at a time (a byte), are written in the data register of the serial connection circuit 8, from where the bits are transmitted one by one to the data line (RX/TX). For example, control information can be written on the connection interface 7 so that the processor 1 sets the address of the serial connection circuit 8 in the address bus and writes the required data, e.g. one byte containing 8 bits, onto the data bus. Thus, the serial connection circuit recognises the writing of the data and transmits the written data in its own internal buffer (not shown), from which the data is transmitted to the status lines of the connection interface 7. In this context, the status lines of the connection interface 7 indicates other lines than the data transmission line TX, the data reception line RX and the signal ground conductor GND.

Reading the state of the status lines of the connection interface 7 can be implemented e.g. in a way that the lines of the connection interface 7 are read as one byte from the connection address, whereby certain bits of the read byte correspond to certain lines of the connection interface 7. For example, bit 0 indicates the state of the reception line RX, bit 1 the state of the status line DTR of the telecommunication terminal, and bit 2 the state of the transmission request line RTS. In the control of the output lines, this same principle can be applied in a way that the processor 1 writes the desired bit pattern in this connection address so that the desired logical state of the output line is set in the corresponding bits of the output lines. In the examples of this specification, bit 3 is used for controlling the transmission line TX, bit 4 for controlling the status line DSR of the communication device, bit 5 for controlling the data carrier detect line DCD, bit 6 for controlling the ring indicator RI, and bit 7 for controlling the data carrier detect line DCD. When writing to this connection address, the bits b0, b1, b2 corresponding to the input lines are set advantageously in the logical 1 state. Thus, these bits have no effect on the voltage values of the lines corresponding to the bits.

Advantageously, the application software of at least the receiving telecommunication terminal TE1, TE2 is provided with a message interpreter which examines the received messages and, on the basis of this, controls certain operations, as will be disclosed in the examples below. Thus, the message interpreter is an application program of the processor 1, and several known solutions are available in its implementation. For example, the messages to be applied in the system and the corresponding operations are stored in the memory 3 of the mobile station at the stage of introducing the system. The message interpreter compares the message received by it with messages stored in the memory 3, e.g. by carrying out the comparison character by character. The comparison of one message can be stopped at the stage when the character to be compared does not correspond to the character of the received message. After this, the message interpreter moves on to examine the next message, until a corresponding message is found. If, for any reason, the message interpreter does not find a message corresponding to the received message in the memory 3, it is possible to generate e.g. an error notice which is transmitted as a short message to the telecommunication terminal TE1, TE2 that sent the control message.

On the basis of the messages, the data on the operations to be carried out is also stored advantageously in the memory 3. This data contains e.g. whether the state of the status lines of the connection interface 7 is to be read or whether the state of one or more status lines of the connection interface 7 is to be set. Information about the state in which the status line of the connection interface 7 is set is stored in the memory 3, or this status information is contained in the received message, or the state is changed to the opposite (0→1, 1→0).

Table 1 shows an example of the message structure available in the system according to the invention. The messages relate to a door locking system which will be described in more detail below, in connection with the description of FIG. 7. The messages are stored in text form, and each character of the message consists of eight bits, i.e. one byte. The first character of the message is information about the length of the message. On the basis of this length information, the message interpreter knows the terminal point of the message. At the end of the message, two bytes are reserved for storing information on the operation to be carried out on the basis of the message. The first byte informs advantageously whether it involves reading of states (the value of the byte is e.g. 0), setting of states (the value of the byte is e.g. 1), or both reading and setting of states (the value of the byte is e.g. 2). The second byte informs the status to be set on the status line. For clarity, this second byte is shown as a binary digit, whereby the right hand side digit refers to the bit 0 (b0) and the left hand side digit refers to bit 7 (b7).

TABLE 1

| 11 | Close door | 1 | 00010111 |
|----|-----------|---|----------|
| 8  | Open door | 1 | 00000111 |

Figure 4:
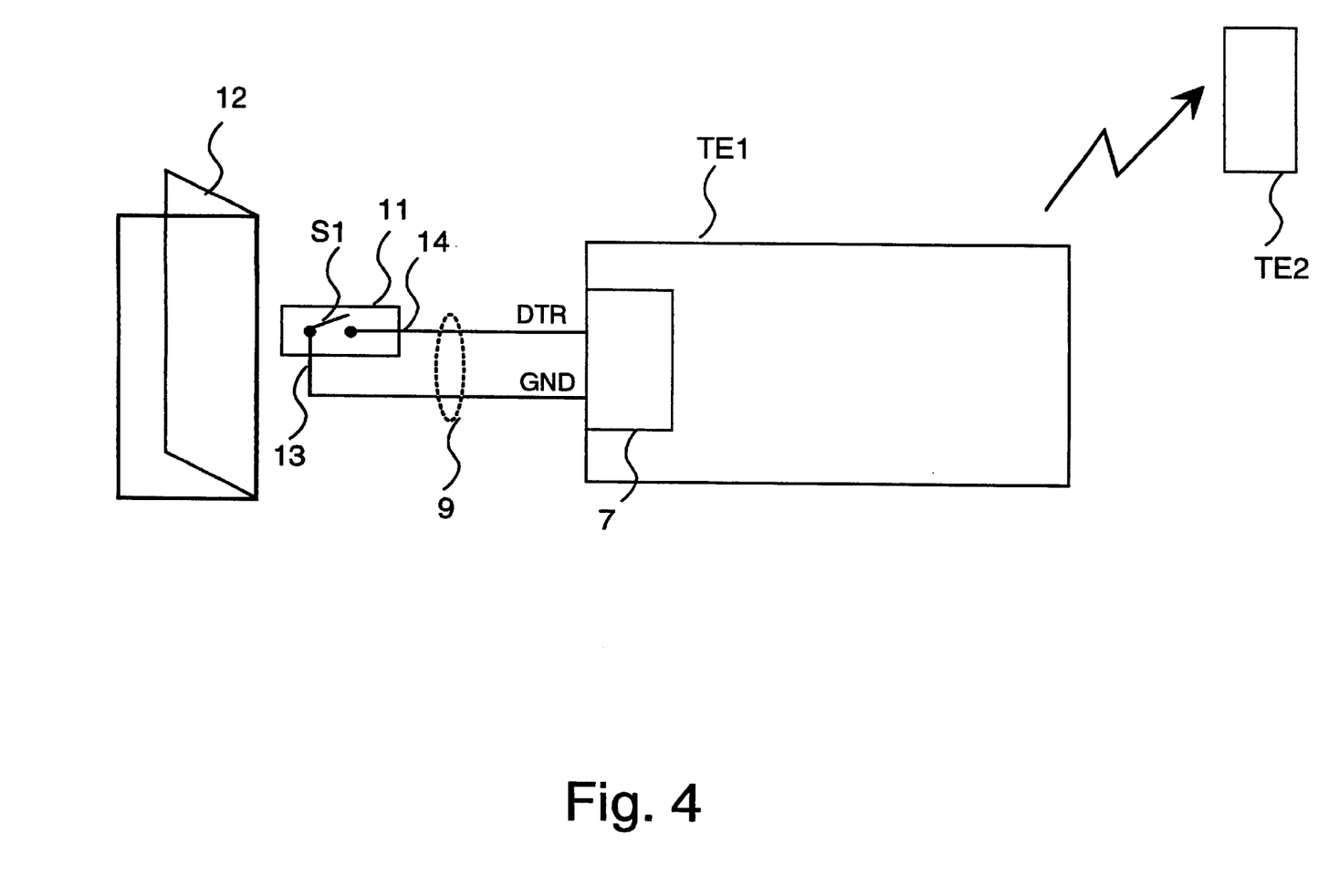
FIG. 4 is a reduced block chart showing the system according to an advantageous embodiment of the invention.

In the following, the operation of the method according to the invention will be presented with some application examples. In FIG. 4, the peripheral device 11 is a switch S1 arranged in connection with a door 12, for recognising whether the door 12 is open or closed. The first connection line 13 of the switch S1 is connected to the signal ground conductor GND of the connection interface 7 of the first telecommunication terminal TE1, and the second connection line 14 of the switch S1 is connected to the status line DTR of the telecommunication terminal of the connection interface 7. Further, at the connection interface 7, the input lines of the first telecommunication terminal TE1 are connected with biasing resistors R1, R2, R3, whereby the status of these input lines is set in the logical 1 state in case said input line is not connected anywhere. In this example situation, it means that when the switch S1 is in the open position, the voltage of the status line DTR5 is ca. 5 V, i.e. the line is in the logical 1 state. In a corresponding manner, when the switch S1 is in the closed position (the door is closed), the voltage of the status line DTR of the telecommunication terminal is ca. 0 V, i.e. in the logical 0 state. The application software of the first telecommunication terminal TE1 is provided with the necessary programs for examining the logical states of the input lines of this connection interface 7 and for setting the logical states of the different output lines to the value (0/1) required at the time, respectively.

The status of the input lines RX, DTR, RTS can be examined for example by polling, whereby e.g. a short message is sent from the second telecommunication terminal TE2, requesting the transmission of status information of the connection interface from the first telecommunication terminal TE1 to the second telecommunication terminal TE2. This short message can be stored e.g. in the memory of the second telecommunication terminal TE2, where it can be selected by the user, if necessary, and transmitted. The received short message is examined in the first telecommunication terminal TE1, whereby in the situation of receiving a query message, the states of the input lines of the connection interface 7 are read in the first telecommunication terminal TE1. This is implemented advantageously in a manner presented above in this description.

When examining the states of the input lines of the connection interface 7, it is also possible to utilise interruptions. Thus, the setting up of an interrupt request can be determined for any line on the change of state of this line. The interrupt request can be determined so that it is set up always upon a change of state of said line (0→1 and 1→0) or only when the state of said line is changed in a certain direction (0→1 or 1→0). As a result of the interrupt: request, the processor 1 moves on to run a so-called interrupt service program for examining the reason for the interruption. The interrupt service program can be common to all interruptions, whereby the processor 1 scans the cause for the interruption from state variables or the like. In another alternative, there are several interrupt service programs, possible one for each cause for an interrupt request, whereby the interrupt request causes that the processor 1 moves on to that interrupt service program where the interruption by the cause of the interrupt request is processed, which is known as such.

In these application examples, it is assumed that a change of state in any input line of the connection interface 7 causes an interrupt request which is processed in the same interrupt service program. Thus, as a result of a change in the state, the processor 1 moves on to run the interrupt service program relating to the interrupt request in question, unless the interrupts were forbidden. The interrupt service program contains read functions of the connection address of the connection interface, whereby the processor 1 reads the information contained in this connection address, i.e. the states of the input lines of the connection interface 7. Further, the interrupt service program sets the state variable value whereby the application software is informed about a change in the state of any line of the connection interface. After the termination of the interrupt service program, the running of the application program is continued from the point of interruption. The application software is supplemented with examining of the state variable value, whereby the processor 1, after detecting the change in the state variable value, moves on to run the program for transmitting data on the state of the connection interface 7.

The program for transmitting status data can be implemented e.g. in a way that it contains transmission of the states of all input lines at the moment of examination, advantageously as a short message to the second telecommunication terminal TE2. In another alternative, only the state of the input line that was changed is transmitted. In the short message, it is possible to use a short message stored in the first telecommunication terminal TE1, supplemented with information about the state of each input line, e.g. in the form "the states of the input lines are: RX=0, DTR=1, RTS=0". On the other hand, these input lines can also be provided with standard texts, e.g. in a way that instead of the logical 0 state of the input line, a first standard text determined for this input line is transmitted, for example "door is closed", and in the logical 1 state of the input line, a second standard text determined for this input line is transmitted, for example "door is open". Thus, the user does not need to remember what is monitored by each input line.

One advantage of the above-mentioned interrupt principle is the fact that information about the change of state can be detected as soon as possible. On the other hand, it is an advantage of the inquiry principle that in a situation where several less critical changes of state take place within a short period of time, the communication system is not loaded to an unnecessary degree.

Figure 5:
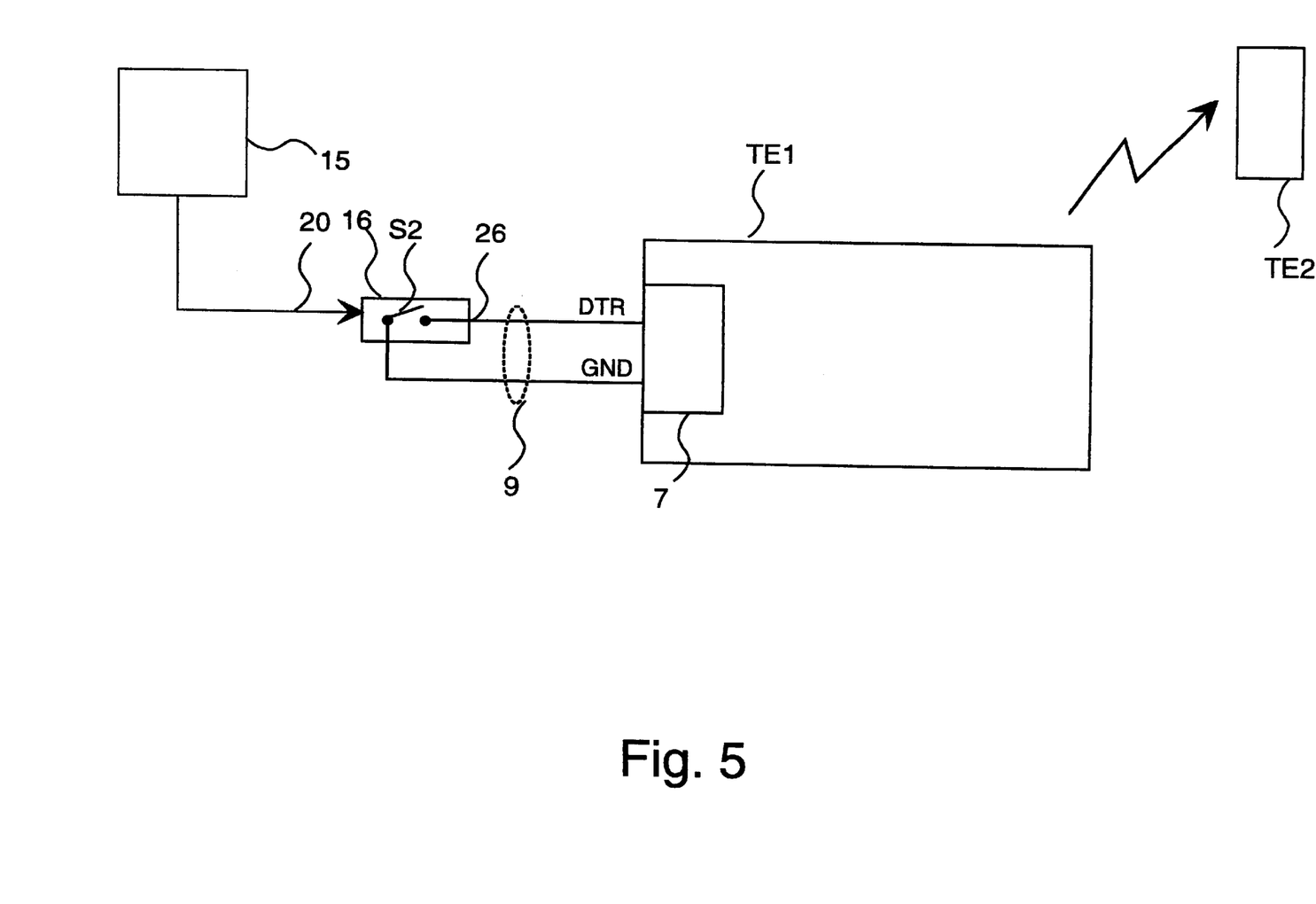
FIG. 5 is a reduced block chart showing the system according to a second advantageous embodiment of the invention.

FIG. 5 shows a system where e.g. a real estate alarm system 15 is coupled to a first telecommunication terminal TE1 for transmitting the state of the alarm system e.g. to the telecommunication terminal of a guard. The alarm line 20 of the alarm system is coupled to a relay 16, whereby in the case of an alarm, the position of the switch S2 of the relay 16 is changed e.g. from the open position to the closed position, which is detected as a change of state in the input line of the connection interface 7 which is connected with the first connection line 26 of the switch S2 of the relay in the connection interface 7 of the telecommunication terminal TE1. Also in this example, the input line used is the status line DTR of the telecommunication terminal. The change of state is detected preferably as an interruption, whereby information about the alarm is transmitted as soon as possible to a second telecommunication terminal TE2.

Figure 6:
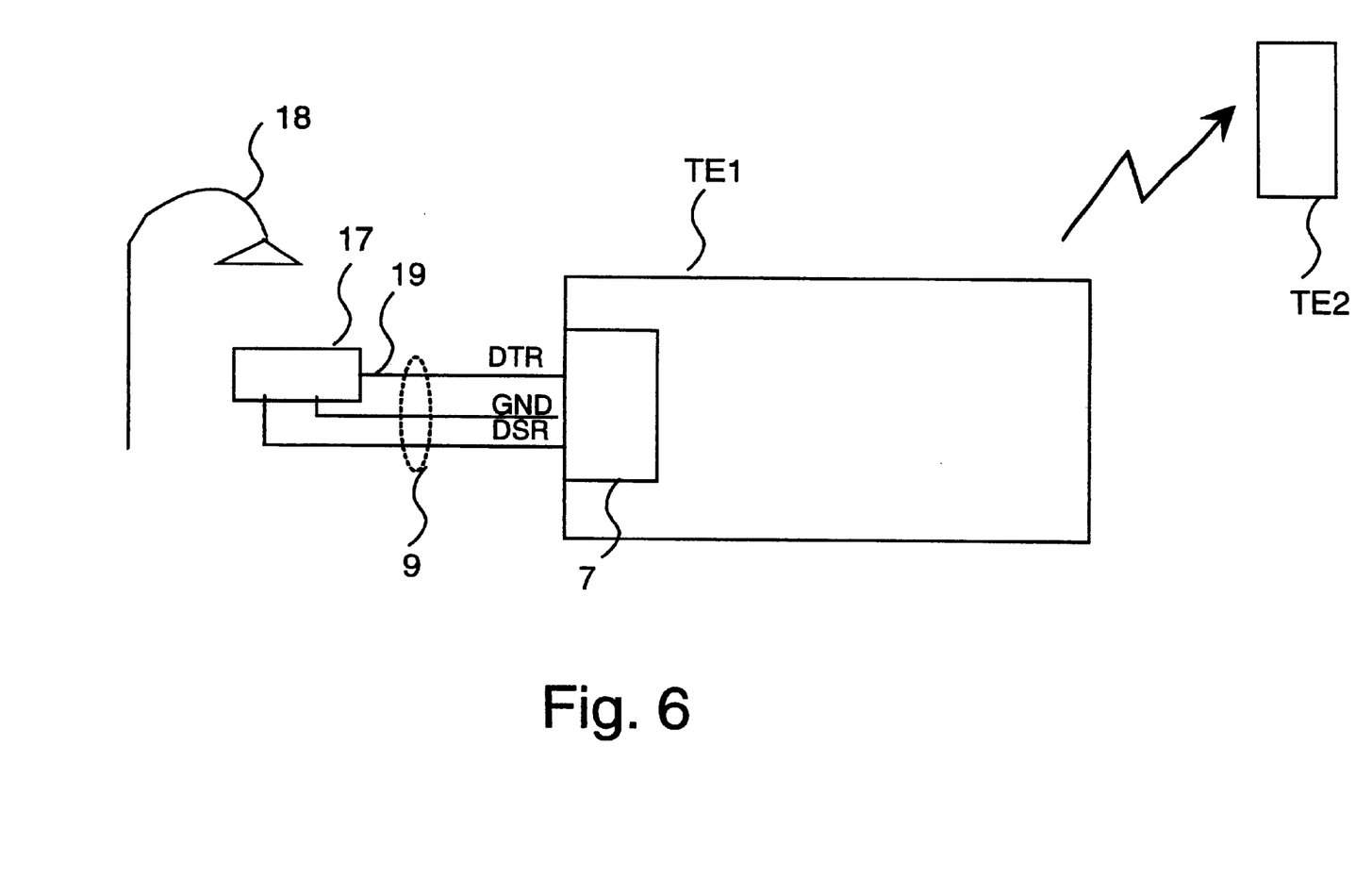
FIG. 6 is a reduced block chart showing the system according to a third advantageous embodiment of the invention.

FIG. 6 shows a system, whereby the operation of an illuminator 18 is examined by a luminous intensity sensor 17. For the time of the measurement, the luminous intensity sensor 17 is supplied with a supply voltage via the output line of the connection interface 7, which in this example is the status line DSR of the telecommunication terminal, and after this, the measurement can take place by examining the logical state of the output line 19 of the luminous intensity sensor, which in this example is connected with the status line DTR of the telecommunication terminal. The measurement is started by transmitting a short message, such as "check if the room is too dark" from the second telecommunication terminal TE2. The first telecommunication terminal TE1 interprets the received short message and sets the voltage supplied to the luminous intensity sensor 17 so that the status line DSR of the telecommunication terminal is set in the logical 1 state. The luminous intensity sensor 17 is further connected with the signal ground conductor GND of the connection interface 7. Next, the processor 1 of the first telecommunication terminal reads the state of the status line DTR of the telecommunication terminal. If the illuminator 18 is broken and it is too dark in the room to be examined (for example, the output line 19 of the luminous intensity sensor is in the logical 0 state), a short message "the room is too dark" is transmitted from the first telecommunication terminal TE1. However, when the illuminator 18 is unbroken, the output line 19 of the luminous intensity sensor is in the second state (for example, in the logical 1 state), whereby a descriptive message "the room is sufficiently illuminated" is transmitted from the first telecommunication terminal TE1. After the measurement, the supply voltage is cut from the luminous intensity sensor 17 by setting the status line DSR of the telecommunication terminal in the logical 0 state.

Figure 7:
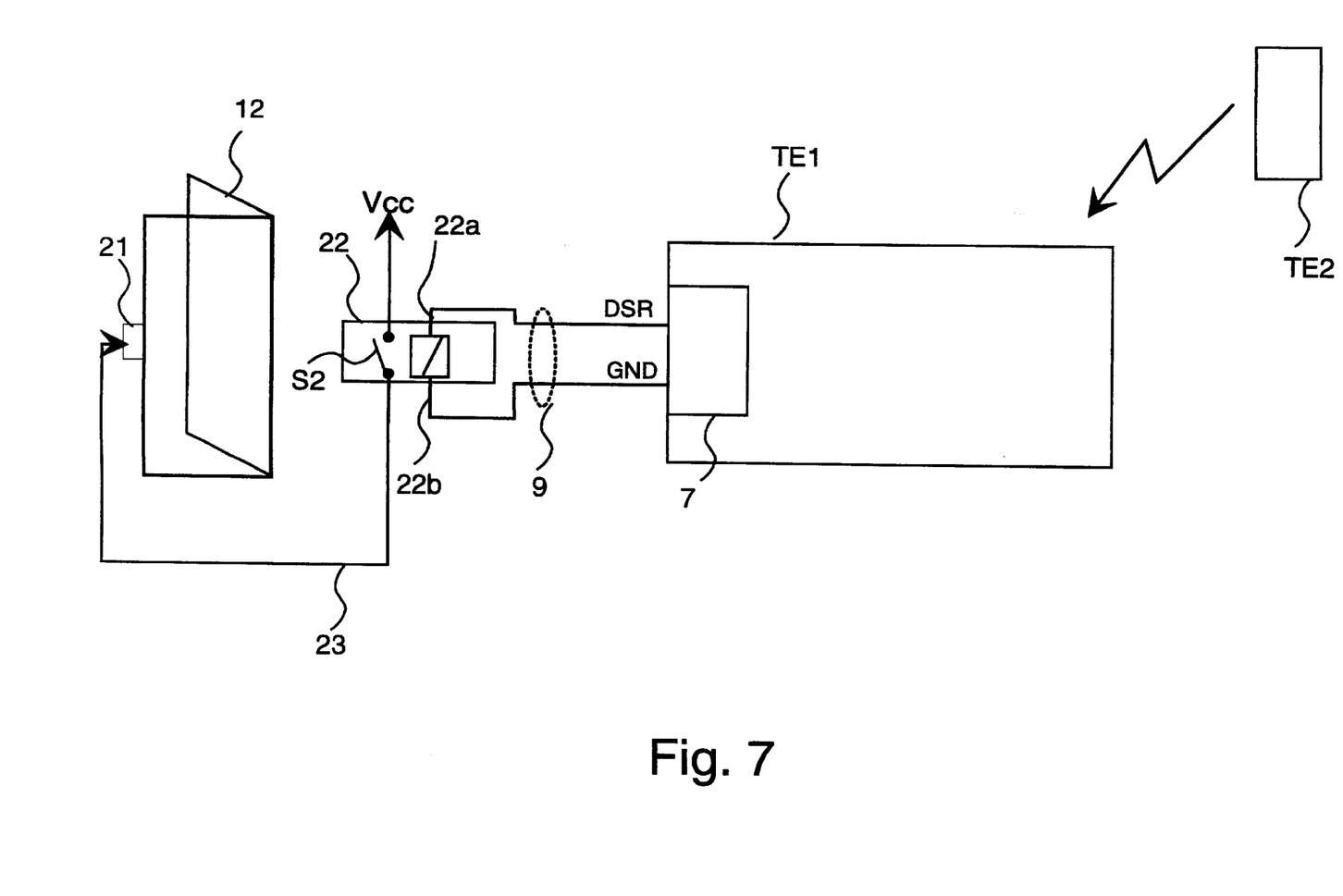
FIG. 7 is a reduced block chart showing the system according to a fourth advantageous embodiment of the invention.

FIG. 7 shows an example where the invention is applied in a door locking system. The locking of a door 12 is controlled by a locking system 21 advantageously so that when a voltage is turned on in a locking relay 22, the switch S2 of the locking relay is closed and turns on a control voltage Vcc of, for example, 24 V, in the locking system, whereby the lock plunger (not shown) of the door 12 is moved in the locking position. In a corresponding manner, by cutting the voltage from the locking relay 22, the switch S2 of the locking relay is opened, turning off the control voltage Vcc of the locking system from the locking line 23. Thus, the lock plunger is moved in the open position. For switching the voltage of the locking relay 22, e.g. the status line DSR of the telecommunication terminal is used, coupled with the first switching pin 22a of the locking relay 22. The signal ground conductor GND is coupled with the second switching pin 22b of the locking relay 22. The door is locked by transmitting a short message, such as "lock the door", from the second telecommunication terminal TE2. In the first telecommunication terminal TE1, the received short message is interpreted and the locking relay 22 is supplied with an operating voltage by setting the status line DSR of the communication device in the logical 1 state. This causes a voltage difference of, for example, ca. 5 V between the switching pins 22a, 22b of the locking relay 22, thereby closing the switch S2 of the locking relay 22. The locking of the door 12 can be released in a corresponding manner by sending a short message, such as "open the door", from the second telecommunication terminal TE2. In the first telecommunication terminal TE1, the received short message is interpreted and the supply voltage is turned off from the locking relay 22 by setting the status line DSR of the telecommunication terminal in the logical 0 state. Thus, the switch S2 of the locking relay 22 will open.

Figure 8:
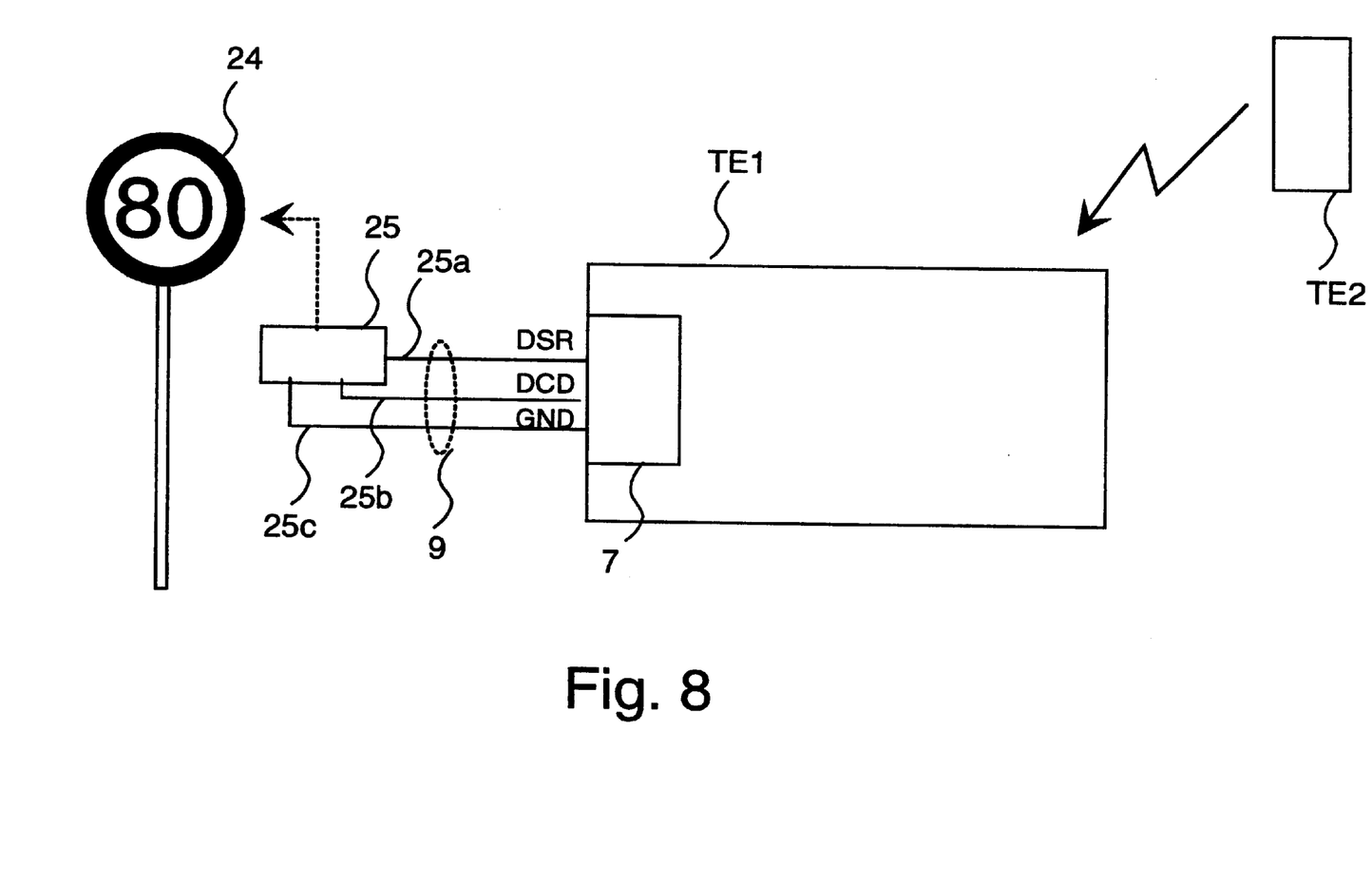
FIG. 8 is a reduced block chart showing the system according to a fifth advantageous embodiment of the invention.

Further, FIG. 8 shows an example of how the invention can be applied in controlling a so-called variable traffic sign 24. The variable traffic sign 24 is for example a speed limit sign in which two or more different speed limits can be set. In this example, the speed limits are 80 km/h and 100 km/h, but the invention can be applied also in other speed limits and in other variable traffic signs than speed limit signs. The variable traffic sign 24 is arranged to be controlled via a control device 25. The control device 25 is provided with two control lines 25a, 25b, the first of which being in this example coupled to the status line DSR of the telecommunication terminal and the second control line 25b being coupled to the data carrier detect line DCD. Further, a signal ground conductor GND is coupled to the ground potential line 25c of the control device 25. With these control lines 25a, 25b, the information shown by the variable traffic sign 24 can be set advantageously in the following way.

The control voltage is switched into the first control line 25a for making the variable traffic sign 24 display first information, in this case the speed limit 80 km/h. Thus, the control device 25 changes the visual properties of the variable traffic sign 24 so that the variable traffic sign 24 displays this speed limit. In practical traffic signs, this can be implemented e.g. by using bright light emitting diodes (LED). The variable traffic sign is set to display the speed limit 80 km/h by sending a short message, such as "Set 80 km/h as the speed limit", from the second telecommunication terminal TE2. In the first telecommunication terminal TE1, the received short message is interpreted and the status line DSR of the communication device switched to the first control line 25a is set in the logical 1 state and the data carrier detect line DCD connected with the second control line 25b is set in the logical 0 state.

In a corresponding manner, the control voltage is switched to the second control line 25b for making the variable traffic sign 24 display second information, in this case the speed limit of 100 km/h, by transmitting a short message, such as "Set 100 km/h as the speed limit", from the second telecommunication terminal TE2. In the first telecommunication terminal TE1, the received short message is interpreted and the status line DSR of the telecommunication terminal is set in the logical 0 state and the data carrier detect line DCD coupled to the second control line 25b is set in the logical 1 state.

There are also numerous other applications of the method according to this invention, whereby the principles presented above can be used in their implementation.

For preventing misuse of monitoring and control systems according to the invention, it is possible to supplement the transmission of the messages with various encryption solutions, such as the use of encryption keys for the encryption of the transmitted message and, at the receiving end, for decoding the encrypted message, respectively. Further, on the basis of the identification of the transmitting telecommunication terminal TE1, TE2 that is transmitted with the message, it is possible to make sure at the receiving end that the message was really transmitted from the telecommunication terminal TE1, TE2 belonging to the system. For example in digital telecommunication networks, the telephone number of the telecommunication terminal that sets up the call or transmits a message is usually sent to the receiving telecommunication terminal.

It is obvious that the invention can be implemented also in connection with connection interfaces of other kind than those complying with the V.24 standard. For example, it is possible to use a so-called parallel connection (centronics), whereby eight control messages can be generated and, respectively, the status of eight measurement messages can be examined at a time.

Although in the examples described above, the short message system of the GSM mobile communication system was used, the invention can also be applied by using other connectionless message transmission systems, such as unstructured supplementary service data USSD or general packet radio service GPRS.

In the transmission of messages, it is still possible to use the so-called acknowledgement principle, whereby the receiving device transmits acknowledgement information when the receiving device has actually received a message. In the transmitting device, time control can be used, whereby the acknowledgement message should be received within a certain time. If no acknowledgement is received, it is possible e g. to try to send the message to another predetermined telephone number or to try to retransmit the message later.

The invention is not limited solely to the embodiments presented above but it can be modified within the scope of the appended claims.

What is claimed is:

1. A system for transmitting status data, comprising:
    a first telecommunication terminal with at least one connection interface comprising connection lines,
    means for examining and/or setting the state of at least one connection line of the connection interface,
    a second telecommunication terminal, and
    means for setting up a data transmission connection between the first and second telecommunication terminal
wherein the status of at least one connection line of the connection interface is arranged to be transmitted between the first telecommunication terminal and the second telecommunication terminal, in a manner that one or several connnectionless messages are arranged to be used in the transmission.

2. The system according to claim 1, wherein the connectionless message is a short message (SM).

3. The system according to claim 1, wherein the connectionless message is a message complying with the general packet radio service (GPRS).

4. The system according to claim 1, wherein the connectionless message is a message complying with the unstructured supplementary service data (USSD).

5. The system according to claim 1, wherein said system is arranged to be used for transmission of status data of at least one connection line of the connection interface to the second telecommunication terminal.

6. The system according to claim 1, wherein said system is arranged to be used for setting the status data of at least one connection line of the connection interface by means of one or several connectionless messages to be transmitted from the second telecommunication terminal.

7. The system according to claim 1, further comprising:
    a peripheral device and
    means for the transmission of status data generated by the peripheral device to a connection line of the connection interface.

8. The system according to claim 1, further comprising:
    a peripheral device and
    means for the transmission of the status of a connection line of the connection interface to the peripheral device.

9. A method for transmitting status data of connection lines of a connection interface comprising the steps of:
    examining and/or setting the state of at least one connection line of the connection interface,
    setting up a data transmission connection between a first and a second telecommunication terminal, and
    transmitting status data between the first telecommunication terminal and the second telecommunication terminal in a manner that one or several connectionless messages are used in the transmission.

10. The method according to claim 9, wherein the status data of at least one connection line of the connection interface is transmitted to the second telecommunication terminal with one or several short messages (SM).

11. The method according to claim 9, wherein the status of at least one connection line of the connection interface is set with one or several short massages (SM) transmitted from the second telecommunication terminal.

12. The method according to claim 9, wherein the connectionless message is a message complying with the general packet radio service (GPRS).

13. The method according to claim 9, wherein the connectionless message is a message complying with the unstructured supplementary service data (USSD).

14. Telecommunication terminal comprising:
    at least one connection interface comprising connection lines,
    means for examining and/or setting the state of at least one connection line of the connection interface,
    means for transmitting the data to a second telecommunication terminal, and
    means for transmitting the status data of at least one connection line of the connection interface between said telecommunication terminal and the second telecommunication terminal in a manner that one or several connectionless messages are used in the transmission.

15. The telecommunication terminal according to claim 14, wherein the connectionless message is a message complying with the general packet radio service (GPRS).

16. The telecommunication terminal according to claim 14, wherein the connectionless message is a message complying with the unstructured supplementary service data (USSD).

* * * * *